US 9,979,845 B2

(12) United States Patent
Maeda

(10) Patent No.: US 9,979,845 B2
(45) Date of Patent: May 22, 2018

(54) IMAGE READING APPARATUS AND IMAGE READING METHOD

(71) Applicant: BROTHER KOGYO KABUSHIKI KAISHA, Nagoya, Aichi (JP)

(72) Inventor: Takashi Maeda, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days. days.

(21) Appl. No.: 15/459,381

(22) Filed: Mar. 15, 2017

(65) Prior Publication Data
US 2017/0279979 A1    Sep. 28, 2017

(30) Foreign Application Priority Data

Mar. 28, 2016 (JP) .................. 2016-063316

(51) Int. Cl.
| H04N 1/04 | (2006.01) |
|---|---|
| H04N 1/00 | (2006.01) |
| H04N 1/10 | (2006.01) |
| H04N 1/028 | (2006.01) |
| H04N 1/03 | (2006.01) |

(52) U.S. Cl.
CPC ....... *H04N 1/0071* (2013.01); *H04N 1/00037* (2013.01); *H04N 1/00551* (2013.01); *H04N 1/00687* (2013.01); *H04N 1/00702* (2013.01); *H04N 1/00713* (2013.01); *H04N 1/00737* (2013.01); *H04N 1/00742* (2013.01); *H04N 1/00771* (2013.01); *H04N 1/00816* (2013.01); *H04N 1/02815* (2013.01); *H04N 1/0306* (2013.01); *H04N 1/1065* (2013.01); *H04N 2201/0081* (2013.01)

(58) Field of Classification Search
CPC ............ H04N 1/0071; H04N 1/00713; H04N 1/00737; H04N 1/00742; H04N 1/00702
USPC .................................................. 358/497, 498
See application file for complete search history.

(56) References Cited

U.S. PATENT DOCUMENTS

2009/0316233 A1 * 12/2009 Inukai .................. H04N 1/0473
358/498

FOREIGN PATENT DOCUMENTS

| JP | 2000-134416 A | 5/2000 |
|---|---|---|
| JP | 2010-226690 A | 10/2010 |

* cited by examiner

*Primary Examiner* — Houshang Safaipour
(74) *Attorney, Agent, or Firm* — Scully, Scott, Murphy & Presser, PC

(57) ABSTRACT

A controller of an image reading apparatus is configured to cause the reading device to read an image on an original with moving a reading location from a first position to a second position, after reading the image on the original with moving the reading location from a third position to the first position, the third position being a position between the first position and the second position and spaced from the first position by a particular distance and determining a width of the original in the main scanning direction. The controller is configured to further move the reading location from the second position to the first position, and detect an instruction to continue reading a subsequent original during a period before the reading location reaches the third position. When the instruction is detected, the controller stops moving the reading location when it reaches the third position.

18 Claims, 11 Drawing Sheets

IMAGE READING APPARATUS AND IMAGE READING METHOD

CROSS-REFERENCE TO RELATED APPLICATIONS

This application claims priority under 35 U.S.C. § 119 from Japanese Patent Application No. 2016-063316 filed on Mar. 28, 2016. The entire subject matter of the application is incorporated herein by reference.

BACKGROUND

Technical Field

The present disclosures relate to an image reading apparatus.

Related Art

There has been known an original reading device configured to automatically detect a size of an original placed on an original table of an original reading apparatus.

An example of such a conventional original reading apparatus has a point light source array provided with multiple point light sources which are linearly arranged in a main scanning direction and an image sensor linearly extending in the main scanning direction. The conventional original reading apparatus causes the pint light source to emit light toward the original placed on the original table, and then receives the reflected light from the original by the image sensor. With this configuration, the original reading apparatus detects presence/absence of the original in the main scanning direction, thereby executing an original size detecting process.

The conventional original reading apparatus is generally provided with a pressure plate, which is configured to move with respect to the original reading apparatus and have a closing state where the pressure plate covers an upper face of the original table, and an opening state where the pressure plate exposes the upper face of the original table. In response to detection of the opening state of the pressure plate, the original reading apparatus moves a carriage which mounts the point light source array from a hope position (i.e., a standby position) to an original reading position. Thereafter, in response to detection of the closing state of the pressure plate, the original reading apparatus lights up the point light source array, and executes an original size determining process by moving the carriage from the original reading position to the home position with detecting presence/absence of the original in the main scanning direction.

After having determined the original size, the original reading apparatus puts out the pint light source array, stops the carriage at the home position, and waits for an input operation to input an instruction to execute reading of the original.

SUMMARY

According to the above-described configuration of the conventional original reading apparatus, the original size determining process with respect to second and subsequent originals, after completion of image reading of the first original, is not executed. Typically, the conventional original reading apparatus is configured such that, after completion of image reading of the first original, the carriage is moved to the home position. Therefore, when second and subsequent originals are to be read, if the original size determining process is to be executed with respect to the second original, it becomes necessary to move the carriage from the home position to the original reading position in order to determine the size of the second original. With respect to third and subsequent originals, the similar control is required. If such a configuration is employed, a certain time is required to execute the original size determining process with respect to the next original, after completion of the image reading of the previous original, since the carriage is to be moved to the home position, and then moved from the home position to the original reading position. Therefore, in order to read multiple originals, relatively long time period is required.

In consideration of the above problem, the aspects of the present disclosures provide an image reading apparatus which is configured to read originals with determining the size of each of the originals placed on the original table, and a time period necessary to read multiple originals can be shortened in comparison with the conventional apparatus.

According to aspects of the disclosures, there is provide an image reading apparatus having an original supporting plane configured to support an original to be read, a cover movable between a covering position to cover the original supporting plane and an opening position to expose the original supporting plane, a reading device having multiple reading elements arranged in a main scanning direction, the reading device being configured read an image on the original supported by the original supporting plane with moving a reading location on the image in an auxiliary scanning direction which is orthogonal to the main scanning direction and a controller. The controller is configured to execute a reading process in which the controller causes the reading device to read the image on the original placed on the original supporting plane with moving the reading location in the auxiliary scanning direction from a first position which is a reading start position to a second position which is a reading end position, and to generate image data representing the image of the original and a determining process in which the controller causes the reading device to read the image on the original with moving the reading location in the auxiliary scanning direction from a third position to the first position, the third position being a position between the first position and the second position and spaced from the first position, in the auxiliary scanning direction, by a particular distance, and the controller determines a width of the original in the main scanning direction subject to scanning based on the image data, the determining process being executed before execution of the reading process. The controller is configured to further execute, after execution of the reading process, a moving process in which the controller moves the reading location from the second position to the first position, and a detecting process in which the controller detects an instruction to continue reading a subsequent original during a period before the reading location reaches the third position by the moving process. When it is determined that the instruction to continue reading the subsequent original in the detecting process, the controller is configured to terminate the moving process when the reading location reaches the third position, without moving the reading location further to the first position.

According to aspects of the disclosures, there is provided an image reading apparatus having a frame including an original supporting plane configured to support an original on the original supporting plane, a cover provided above the original supporting plane, the cover being movable between an open position and a closed position and configured to cover the original supporting plane while the cover is at the closed position, a reading device having a plurality of photoelectric conversion elements arranged in a main scanning direction and movable between a first position and a second position in a sub scanning direction orthogonal to the main scanning direction, and a controller. The controller is configured to control the reading device to move to a third position that is between the first position and the second position, control the reading device to move from the third position to the first position in the sub scanning direction and to read an image of the original on the original supporting plane while the reading device moves from the third position to the first position, determine a length of the original in the main scanning direction based on the read image, control the reading device to move from the first position to the second position in the sub scanning direction and to read the image of the original on the original supporting plane while the reading device moves from the first position to the second position, control the reading device to move from the second position toward the first position, determine whether the controller receives an instruction to read an image until the reading device arrives at the third position while the reading device moves from the second position toward the first position. The controller is further configured to, when the controller receives the instruction until the reading device arrives at the third position, control the reading device to be positioned at the third position. Further, the controller is configured to, when the controller does not receive the instruction until the reading device arrives at the third position, control the reading device to move to the first position.

According to aspects of the disclosures, there is provided an image reading method employed in an image reading apparatus having an original supporting plane configured to support an original thereon, on the original supporting plane, a cover movably arranged above the original supporting plane, a reading device configured to read a linearly extending area of an image a main scanning direction and is movable between a first position and a second position in a sub scanning direction orthogonal to the main scanning direction. The method includes moving the reading device to a third position that is between the first position and the second position, moving the reading device from the third position to the first position in the sub scanning direction and causing the reading device to read an image of a first original on the original supporting plane while the reading device moves from the third position to the first position, determining a length of the first original in the main scanning direction based on the read image, moving the reading device from the first position to the second position in the sub scanning direction and causing the reading device to read the image of the first original on the original supporting plane while the reading device moves from the first position to the second position, moving the reading device from the second position toward the first position, determining whether the image reading apparatus receives an instruction to read an image of a second original until the reading device arrives at the third position while the reading device moves from the second position toward the first position, locating the reading device at the third position when the image reading apparatus receives the instruction until the reading device arrives at the third position, moving the reading device from the third position to the first position in the sub scanning direction and causing the reading device to read an image of the second original on the original supporting plane while the reading device moves from the third position to the first position, determining a length of the second original in the main scanning direction based on the read image, and moving the reading device from the first position to the second position in the sub scanning direction and causing the reading device to read the image of the second original on the original supporting plane while the reading device moves from the first position to the second position.

BRIEF DESCRIPTION OF THE ACCOMPANYING DRAWINGS

Figure 8:
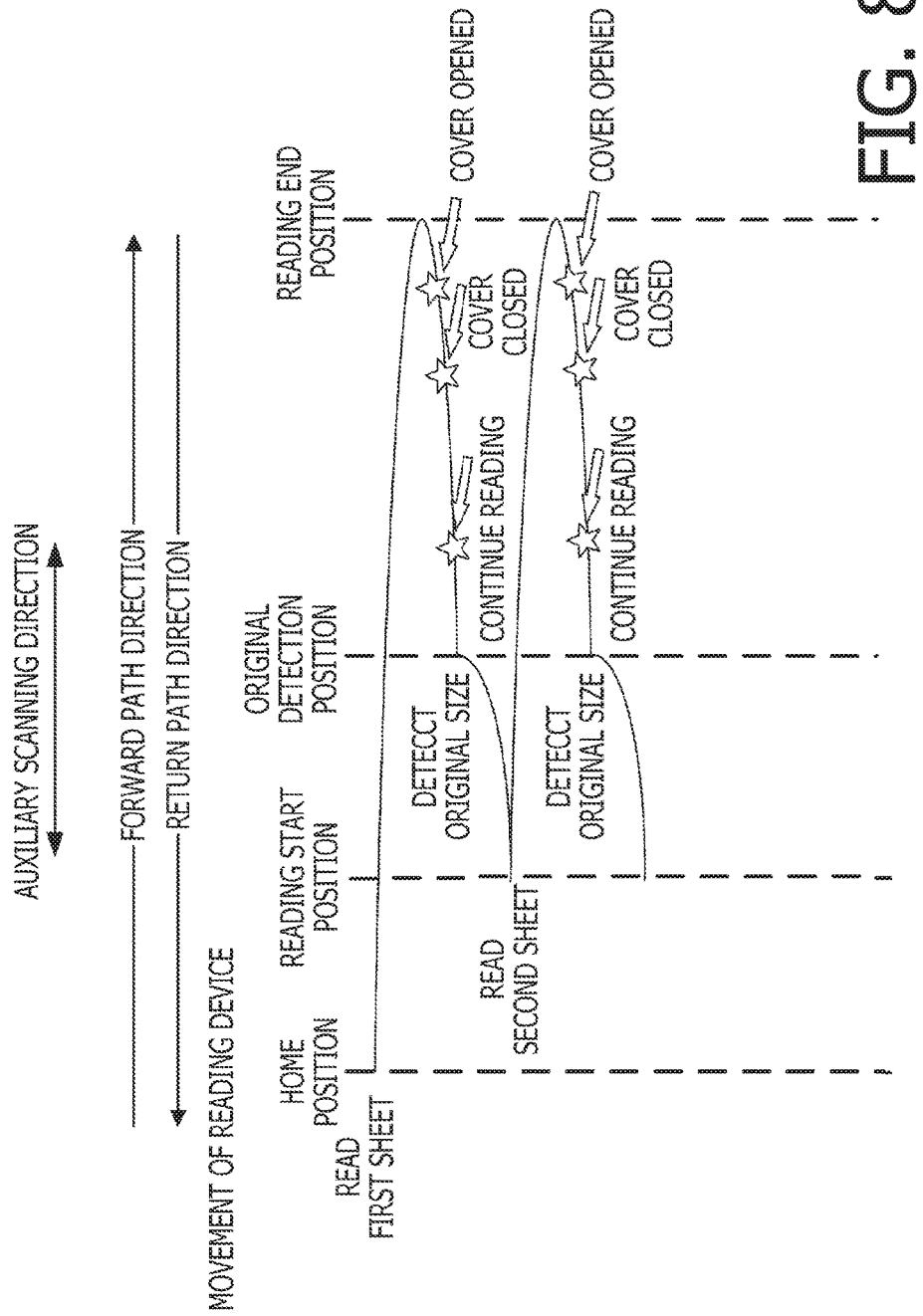

FIG. 8 schematically illustrates an operation of a reading device of the image reading apparatus according to the illustrative embodiment.

Figure 9:
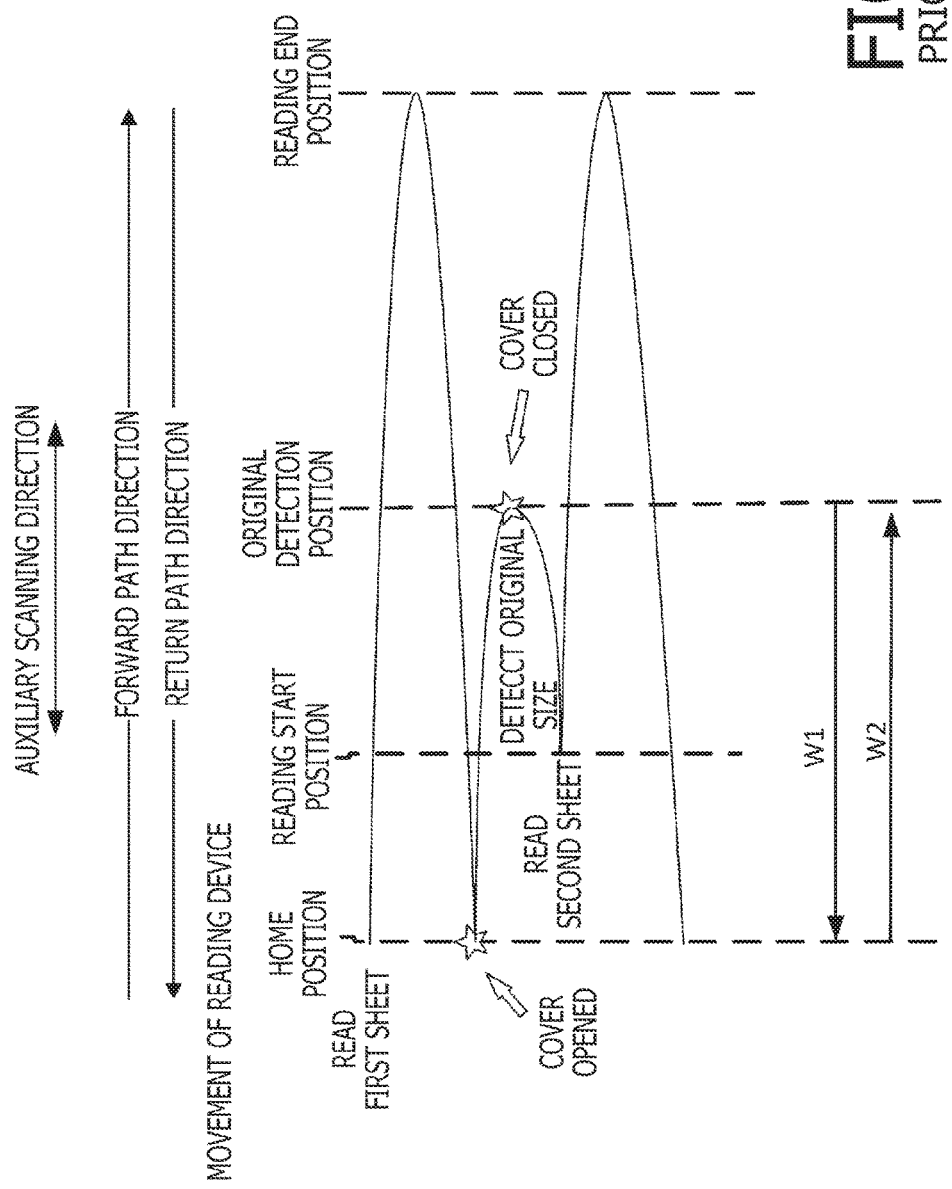

FIG. 9 schematically illustrates an operation of a reading device of a conventional image reading apparatus.

DESCRIPTION OF THE EMBODIMENT

Hereinafter, referring to the accompanying drawings, an image reading apparatus 1 according to an illustrative embodiment of the present disclosures will be described.

Figure 1:
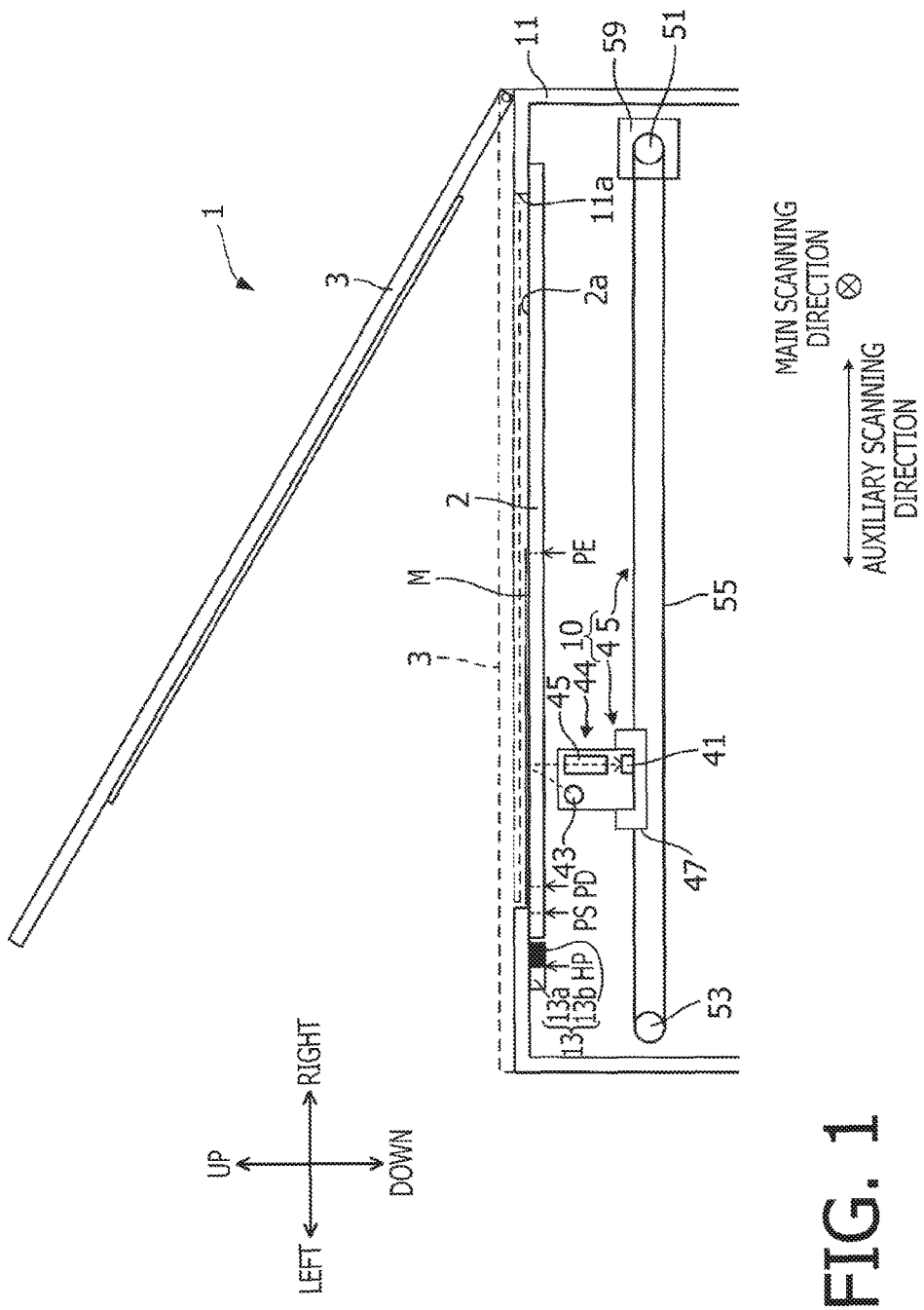
FIG. 1 is a cross-sectional side view schematically showing an inner structure of an image reading apparatus according to an illustrative embodiment of the disclosures.
Figure 2:
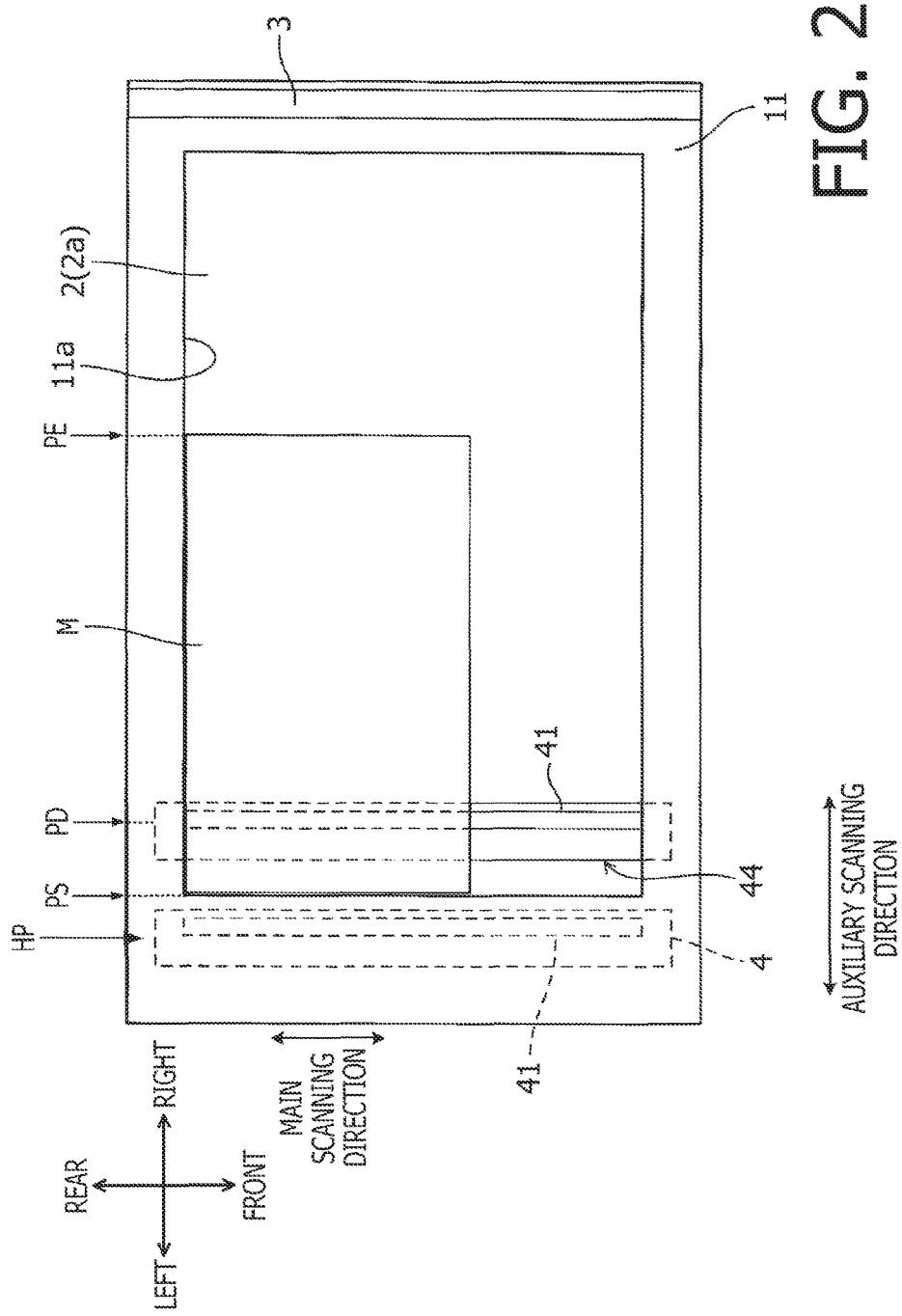
FIG. 2 is a plan view of the image reading apparatus when a cover thereof is opened.

Firstly, a structure of the image reading apparatus 1 will be described, referring to FIGS. 1 and 2. In FIGS. 1 and 2, up, down, right and left directions of the image reading apparatus 1 are indicated. It is noted that directions indicated in FIG. 2 correspond to those indicated in FIG. 1. In the following description, the above definition of the directions will be used.

<Appearance of Image Reading Apparatus>

As shown in FIG. 1, the image reading apparatus 1 has a platen glass 2, a cover 3, a reading device 4 and a moving mechanism 5. The platen glass 2 closes an opening 11a formed on an upper part of a casing 11 of the image reading apparatus 1 from inside. A portion of an upper face of the platen glass 2, which is exposed to outside through the opening 11a, serves as an original placement face 2a on which the original subject to image reading is to be placed. One end part of the cover 3 is rotatably supported on an upper face of the casing 11 so that the cover is rotatable between a covering position (a position indicated by dotted line in FIG. 1: also referred to as a closed position) at which the cover 3 covers the original placement face 2a and an open position (a position indicated by solid lines in FIG. 1) at which the cover 3 does not cover the original placement face 2a (i.e., the original placement face 2a is exposed). It is noted that FIG. 2 is a plan view of the image reading apparatus 1 when the cover 3 is located at the open position. In FIG. 2, a location of the reading device 4 is also indicated. In FIG. 2, the moving mechanism 5 is not indicated for simplification.

The reading device 4 and the moving mechanism 5 are accommodated inside the casing 11 as shown in FIG. 1. The reading device 4 has a CIS (contact image sensor) 44 and a carriage 47. The CIS 44 includes an image sensor 41, a light source 43 and a rod lens array 45, and is mounted on the carriage 47. In FIG. 2, only the image sensor 41 is indicated for simplification. The image sensor 41 is a so-called linear image sensor having multiple light receiving elements (e.g., photoelectric conversion elements) aligned in a main scanning direction which is indicated in FIG. 2. The light source 43 includes, for example, light emitting diodes and configured to emit light toward the platen glass 2. The rod lens array 45 converges light, which is emitted by the light source and is reflected by an illuminated object (i.e., the original), on respective light receiving elements 40 of the image sensor 41. It is noted that a position on the original, of which image is converged on the light receiving elements 40 is a reading location on the original, which corresponds to the location of the reading device 4. According to the above process, one line of image along the main scanning direction of the illuminated object is read.

The moving mechanism 5 is configured to move the reading device 4 in an auxiliary scanning direction (i.e., right-left direction in FIG. 1: also referred to as a sub scanning direction), which is orthogonal to the main scanning direction as shown in FIG. 1. The moving mechanism 5 includes a motor 59 configured to rotate in forward/reverse directions, a driving pulley 51 which is driven by the motor 59, a driven pulley 53, and an endless belt 55 suspended between the driving pulley 51 and the driven pulley 53. As shown in FIG. 1, the driven pulley 53 is arranged on one side end (left end), in the auxiliary scanning direction, inside the casing 11, while the driving pulley 51 is arranged on the other side end (right end), in the auxiliary scanning direction, inside the casing 11. The carriage 47 is secured to the belt 55 so that, as the belt 55 moves reciprocally in accordance with rotation of the driving pulley 51, the CIS 44 mounted on the carriage 47 also moves reciprocally in the auxiliary scanning direction (i.e., right-left direction).

On the left side with respect to the platen glass 3, an adjustment reference plate 13 is arranged. The adjustment reference plate 13 includes a white tape 13a and a black tape 14b, which are arranged in the auxiliary scanning direction. The white tape 13a and the black tape 13b are read by the reading device 4. A position at which image data output by the reading device 4 changes from white pixels to black pixels, or from the black pixels to the white pixels is a home position HP indicated in FIGS. 1 and 2. A controller 9 (see FIG. 3) initially makes the reading device 4 located at the home position HP when the image reading apparatus 1 is powered on. Further, the controller 9 causes the reading device 4 to read an image of the white tape 13a before executing a reading process (described later), to perform a compensation process including white correction and the like.

In the reading process (described later), the controller 9 starts lighting up of the light source 43 of the reading device 4 when the reading device 4 is located at the reading start position PS shown in FIGS. 1 and 2. Next, the controller 9 reads an image line by line (the line extending in the main scanning direction) with moving the reading device 4, in the auxiliary scanning direction, from the reading start position PS shown in FIGS. 1 and 2 to a reading end position PE. It is noted that a linear area of the image to be read at a time (hereinafter, referred to as a reading location) by the reading device 4 extends in the main scanning direction, and as the reading device 4 moves in the auxiliary scanning direction, the reading location on the image also moves in the auxiliary scanning direction accordingly.

The reading start position PS, the reading end position PE and an original detection position PD shown in FIGS. 1 and 2 will be described. The reading start position PS is a left end position of the original placement face 2a. The reading end position PE is a position which is determined by the controller 9 based on a width of the original in the auxiliary scanning direction (hereinafter, referred to as an auxiliary direction width) which is a detection result of an original size detecting process (described later).

Specifically, the reading end position PE is a position spaced rightward from the reading start position PS, in the auxiliary direction, by an amount of the auxiliary direction width of the original. The original detection position PD is a starting position of the original size detecting process (described later), and a position spaced rightward from the reading start position PS, in the auxiliary scanning position, by a particular distance. It is noted that the particular distance is shorter than the auxiliary direction width of the original. Therefore, the original detection position PD is located, as shown in FIG. 1, between the reading start position PS and the reading end position PE.

The controller 9 reads an image on a line basis (in the main scanning direction) with moving the reading device 4, in the auxiliary scanning direction, from the original detection position PD to the reading start position PS in the original size detecting process (described later). It should be noted that the reading start position PS need not be limited to the left end position of the original placement face 2a. The reading start position PS may be a position spaced rightward from the left end of the original placement face 2a, in the auxiliary scanning direction, by a certain distance. In such a case, a possibility that the reading device 4 reads an image of the casing 11 can be avoided.

Figure 3:
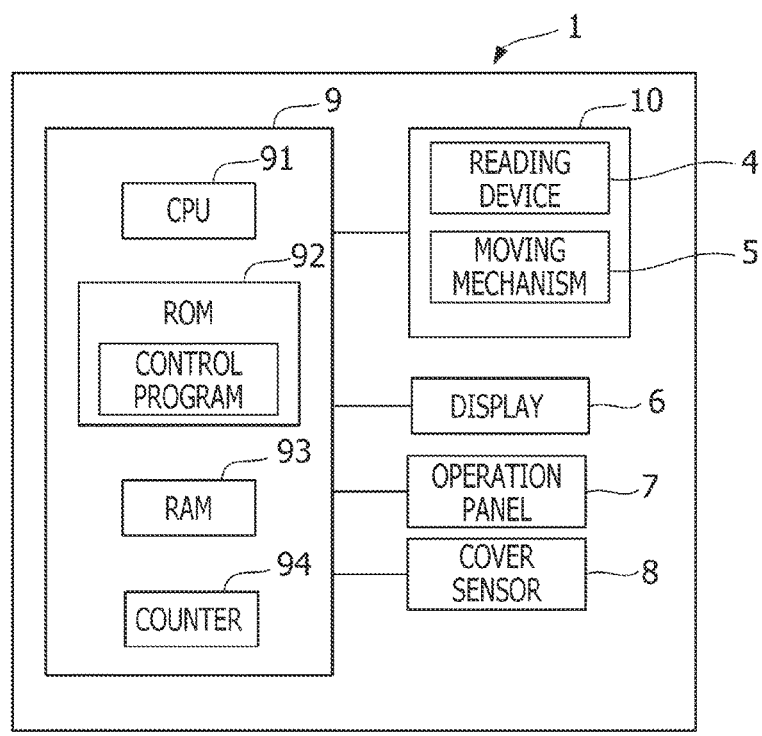
FIG. 3 is a block diagram showing an electrical configuration of the image reading apparatus according to the illustrative embodiment.

On a front face of the casing 11 of the image reading apparatus 1, a display 6 such as an LCD (liquid crystal display), an organic EL (electroluminescence) display or the like, and an operation panel 7 provided with operation buttons including a start key, a stop key, ten keys and the like are arranged (see FIG. 3). With the display 6 and the operation panel 7, operation states of the image reading apparatus 1 are displayed and/or operational instructions of a user can be input. It is noted that the display 6 and the operation panel 7 may be a touch panel having both a displaying function of the display 6 and an input function of the operation panel 7.

<Electrical Configuration of Image Reading Apparatus>

The controller 9 of the image reading apparatus 1 has a CPU 91, a ROM 92, a RAM 93 and a counter 94 as shown in FIG. 3. The controller 9 is connected with the reading device 4 and the moving mechanism 5 of the reading assembly 10, the display 6, the operation panel 7 and a cover sensor 8.

The controller 9 causes the CPU 91 to control respective components of the image reading apparatus 1 in accordance with programs stored in the ROM 92. The ROM 92 stores the programs which cause the controller 9 to execute various operations of the image reading apparatus 1, which include the original size detecting process, a reading process, a post-reading moving process and the like. The ROM 92 also stores a fixed-size original table containing data indicating a length of a shorter side and a length of a longer side of each of a plurality of sizes of fixed-size originals. For example, the fixed-size original table containing the size (i.e., the lengths of the shorter side and longer side) of an A4 sheet (210 mm×297 mm), an A5 sheet (148 mm×210 mm), an A6 sheet (105 mm×148 mm), an A3 sheet (297 mm×420 mm) and the like is stored in the ROM 92. With this configuration, in the original size detecting process (described later), the controller 9 is configured to detect a width of the original in the main scanning direction, compare the detected width with the fixed-size original table to determine the size of the original, and set the reading end position PE based on the detected size of the original.

The RAM 93 serves as a work area in which the control programs are retrieved, and as a temporary storage area in which calculation results of control processes executed by the controller 9, image data generated by the reading assembly 10 and the like are temporarily stored.

The motor 59 of the moving mechanism 5 is a stepping motor, according to the illustrative embodiment. The counter 94 counts a number of driving steps by one, every time the motor 59 is driven by one step. The controller 9 controls rotation of the motor 59 based on the number of driving steps counted by the counter 94. Further, the motor 59 is configured to rotate either forwardly or reversely, and the controller 9 controls the rotating direction and stoppage of the motor 59. The ROM 92 stores the number of driving steps of the motor 59 to move the reading device 4, in the auxiliary direction, from the home position HP to the reading start position PS, and the number of steps to move the reading device 4 from the home position HP to the original detection position PD. It should be noted that the distance from the reading start position PS to the original detection position PD is preferably 15 mm or more, in view of accuracy of the original size detecting process (described later).

The cover sensor 8 is configured to detect, in association with the controller 9, an opening/closing state of the cover 3. For example, a mechanical switch may be used as the cover sensor 8. That is, when the cover 3 is closed, the cover sensor 8 (i.e., the mechanical switch) is pushed by the cover 3 and is in ON state, while, when the cover 3 is opened, the cover sensor 8 is in OFF state as the cover sensor 8 is not pushed by the cover 3. It is noted that the cover sensor 8 need not be limited to have the above configuration as far as the controller 9 can detect the open/closing state of the cover 3 based on the state of the cover sensor 8.

The controller 9 stores a cover open flag, a cover close flag, and a reading continuing flag in the RAM 93 in a post-reading moving process (described later). The cover open flag and the cover close flag are flags indicating the opening/closing state of the cover 3 detected by the cover sensor 8. The reading continuing flag indicates whether an instruction to continue reading the original is input through the operation panel 7.

<Operation of Reading Device>

Next, an operation of the reading device 4 in the post-reading moving process will be described with reference to FIG. 8, and an operation in a conventional post-reading moving process will be described with reference to FIG. 9. In FIGS. 8 and 9, a direction from the reading start position PS toward the reading end position PE, in the auxiliary scanning direction, will be defined as a forward path direction. Further, a direction from the reading end position PE toward the reading start position PS, in the auxiliary scanning direction, will be defined as a return path direction. In order to simplify the following description, it is assumed that the reading end position PE has already been determined as the original size detecting process has been applied to the first original subject to the reading operation.

According to a conventional configuration, as shown in FIG. 9, after the first original has been read as the reading device 4 moves from the home position HP in the forward path direction, the reading device 4 moves from the reading end position PE to the home position HP in the return path direction. Thereafter, when the cover sensor 8 detects that the cover 3 is in the open state, the reading device 4 moves from the home position HP to the original detection position PD in the forward path direction in order to apply the original size detecting process to the second original subject to the reading operation.

In contrast, according to the illustrative embodiment, as shown in FIG. 8, after the first original has been read as the reading device 4 moves from the home position HP in the forward path direction, the reading device 4 starts moving from the reading end position PE in the return path direction. The open/close state of the cover 3 is detected by the cover sensor 8 before the reading device 4 reaches the original detection position PD, and when an instruction to continue reading of a subsequent original has been input through the operation panel, the reading device stops at the original detection position PD.

Thus, movement W1 of the reading device 4 from the original detection position PD to the home position HP, and movement W2 of the reading device 4 from the home position HP to the original detection position PD, which are required in the conventional art shown in FIG. 9, are unnecessary. Regarding the third and subsequent originals, the above movements W1 and W2 are unnecessary according to the illustrative embodiment shown in FIG. 8. Therefore, according to the illustrative embodiment, it is possible to shorten a time period to start the original size detecting process of the second and subsequent originals, in comparison with the conventional reading device as shown in FIG. 9.

<Controlling Process of Image Reading Apparatus>

Next, referring to a flowchart shown in FIGS. 4A and 4B, a controlling process of the image reading apparatus 1 will be described. It is noted that the terms "the forward path direction" and "the reverse path direction" have the same meaning as used in description on FIG. 8.

Figure 4A:
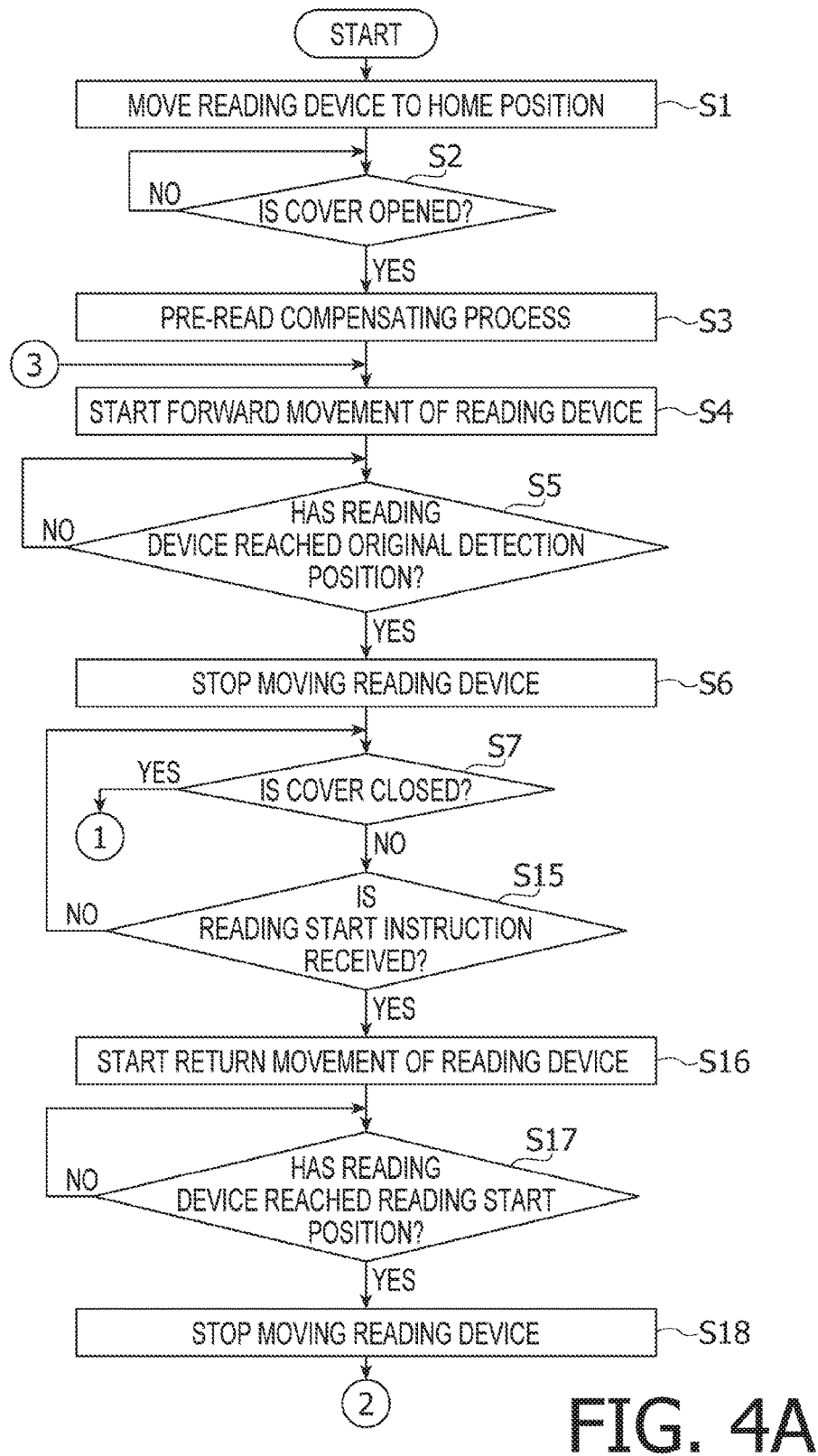
FIGS. 4A and 4B show a flowchart illustrating a controlling process of the image reading apparatus according to the illustrative embodiment.
Figure 4B:
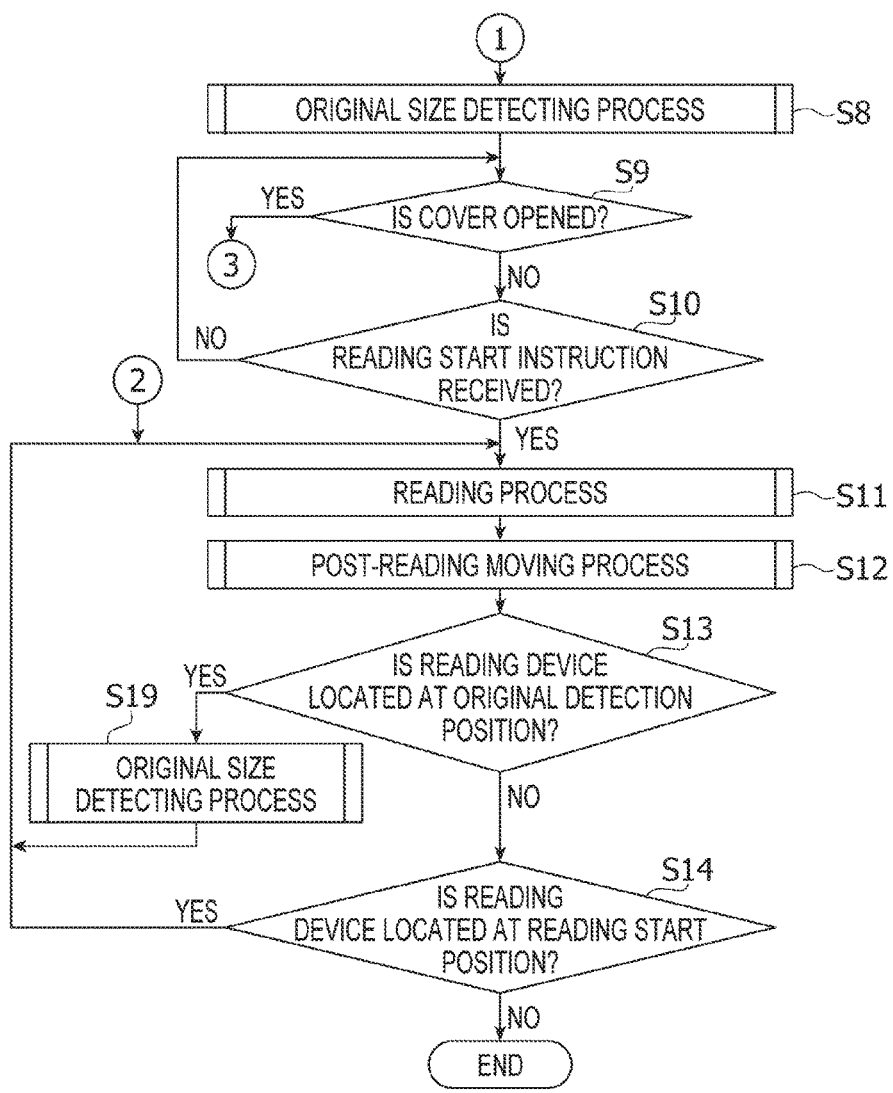

After the image reading apparatus 1 is powered on, the controller 9 executes the controlling process illustrated in FIGS. 4A and 4B. When the controlling process is started, the controller 9 moves the reading device 4 to the home position HP (S1). Next, the controller 9 determines whether the cover sensor 8 detects the opening state of the cover 3 (S2). When it is determined that the cover sensor 8 does not detect the opening state of the cover 3 (S2: NO), the controller 9 repeats S2. When it is determined that the cover sensor 8 detects the opening state of the cover 3 (S2: YES), the controller executes a pre-read compensating process (S3). When the cover sensor 8 detects the opening state of the cover 3, it is highly possible that the user has placed a first original M subject to reading on the original placement face 2*a*. Accordingly, in such a case, the controller 9 causes the reading device 4 to execute pre-read compensating process such as white correction as described above.

Next, the controller 9 starts moving the reading device 4 in the forward path direction (S4), and determines whether the reading device 4 has reached the original detection position PD (S5). The controller 9 determines whether the motor 59 has rotated by a necessary rotating steps so that the reading device 4 reaches the original detection position PD based on the count value of the counter 94. When it is determined that the reading device 4 has not reached the original detection position PD (S55: NO), the controller 9 repeats S55. When it is determined that the reading device 4 has reached the original detection position PD (S5: YES), the controller 4 stops moving the reading device 4 (S6).

Next, the controller 9 determines whether the cover sensor 3 detects the closing state of the cover 3 (S7). When it is determined that the cover sensor 8 detects the closing state of the cover 3 (S7: YES), the controller 9 executes the original size detecting process (S8: see FIG. 4B). This state occurs when the cover 3 is once opened and then closed. Therefore, in such a case, the controller 9 determines that the original M subject to reading has been placed on the original placement face 2a by the user, and executes the original size detecting process.

<Original Size Detecting Process>

The original size detecting process, which is called in S8 of FIG. 4B, will be described. The controller 9 reads an image on the original M placed on the original placement face 2a with moving the reading device 4 from the original detecting position PD toward the reading start position PS, in the forward path direction. The controller 9 detects, as shown in FIG. 2, a front edge and a rear edge, which are parallel to the auxiliary scanning direction, of the original M are extracted from the image data generated by the image reading device 4 in accordance with a well-known edge detecting method, thereby determining a width of the original M in the main scanning direction (hereinafter, referred to as a main direction width). Next, the controller compares the main direction width as determined with the data indicating the sizes of shorter sides and the longer sides of the fixed-size originals in the fixed-size original table, and determines the width of the original in the auxiliary scanning direction (hereinafter, referred to as the auxiliary direction width). The controller 9 sets a position spaced from the reading start position PS by the auxiliary direction width in the forward path direction as the reading end position PE. Then, the controller 9 stores the number of driving steps of the motor 59 necessary to move the reading device 4 from the home position HP to the reading end position PE in the forward path direction in the RAM 93, and terminates the original size detecting process.

It is noted that the controller 9 may read the image of the original M with moving the reading device 4 from the original detection position PD toward the reading start position PS, in the auxiliary scanning direction, and determine the main direction width before the reading device 4 reaches the reading start position PS.

Next, the original size detecting process according to the illustrative embodiment will be described referring to the flowchart shown in FIG. 6. It is noted that the size of the original M is the fixed-size of A4. The controller 9 causes the reading device 4, which stops at the original detection position PD, to start moving in the return path direction (S200). Next, the controller 9 lights up the light source 43 of the reading device 4 (S201), and starts reading the image on the original M (S202). Next, the controller 9 determines whether the reading device 4 has reached the reading start position PS (S203). The controller 9 determines whether the motor 59 has rotated by the number of steps which is necessary for the reading device 4 to reach the reading start position PS based on the count value of the conger 94. When it is determined that the reading device 4 has not reached the reading start position PS (S203: NO), the controller 9 repeats S203. When it is determined that the reading device 4 has reached the reading start position PS (S203: YES), the controller 9 terminates reading of the image (S204).

The controller 9 stores the image data read by the reading device 4 in the RAM 93. Then, the controller 9 puts out the light source 43 of the reading device 4 (S205), and stops the movement of the reading device 4 (S206). The controller 9 determines the main direction width of the original M based on the image data generated by the reading device 4 and identifies the size of the original M (S207) based on the thus determined main direction width as described above. As mentioned above, the controller 9 determines the main direction width based on the image data stored in the RAM 93. Then, as mentioned above, the controller 9 sets the reading end position PE at a position as indicated in FIGS. 1 and 2 based on the main direction width of the original M. Then, as mentioned above, the controller 9 stores the number of driving steps of the motor 59 necessary to move the reading device 4 to the reading end position PE in the forward path direction in the RAM 93, and terminates the original size detecting process.

<Cover Closing State and Reading Strat Instruction>

Next, the controller 9 determines whether the cover sensor 8 detects the opening state of the cover 3 (S9: FIG. 4B). When it is determined the cover sensor 8 detects the opening state of the cover 3 (S9: YES), the controller 9 repeats from step S4 onwards. In this case, the user opened the cover 3, closed the cover 3, and then opened the cover again. Therefore, there is a possibility that the first original M placed on the original placement face 2a may be replaced with another original M by the user. If the original M has been replaced by the user, it becomes necessary to execute the original size detecting process again, and therefore the controller 4 should repeat from step S4 onwards.

When it is determined that the cover sensor 8 has not detected the opening state of the cover 3 (S9: NO), the controller 9 determines whether the reading start instruction is input (S10). It is noted that the reading start instruction is input to the controller 9 as the user depresses a start key or the like of the operation panel 7. When it is determined that the reading start instruction has not been input (S10: NO), the controller 9 repeats from step S9 onwards. When it is determined that the reading start instruction has been input (S10: YES), the controller executes a reading process (S11) described later.

<Cover Opening State and Reading Strat Instruction>

When the cover sensor 8 has not detected the closing state of the cover 3 (S7: NO), the controller 9 determines whether the reading start instruction has been input (S15). It is noted that the reading start instruction is input through the operation panel 7 by the user as in S10. When it is determined that the reading start instruction has not been input (S15: NO), the controller 9 repeats from step S7 onwards. When it is determined that the reading start instruction has been input (S15: YES), the controller 9 starts moving the reading device 4 in the return path direction (S16), and then determines whether the reading device 4 has reached the reading start position PS (S17). The controller 9 determines whether the motor 59 rotates by the number of driving steps necessary for the reading device 4 to reach the reading start position PS based on the count value counted by the counter 94. When it is determined that the reading device 4 has not reached the reading start position PS (S17: NO), the controller 4 repeats S17. When it is determined that the reading device 4 has reached the reading start position PS (S17: YES), the controller 9 executes the reading process described later (S11).

In such a case, the reading start instruction is input through the operation panel 7 with the cover 3 is being opened by the user. If the original size detecting process is executed with the cover 3 being opened, the reading device 4 may receive external light. In such a case, the original size detecting process may not be executed normally. Therefore, in this case, the controller 9 does not execute the original size detecting process, and sets the reading end position PE as the right end position of the original placement face 2a shown in FIGS. 1 and 2. Specifically, the controller 9 stores the number of driving steps of the motor 59 necessary to move the reading device 4 from the home position HP to the reading end position PE in the forward path direction in the RAM 93 in S16, before starting movement of the reading device 4 in the return path direction.

<Reading Process>

Next, the reading process (S11) will be described. The controller 9 reads the image on the original M placed on the original placement face 2a with moving the reading device 4 from the reading start position PS toward the reading start position PS in the forward path direction shown in FIGS. 1 and 2.

Figure 7:
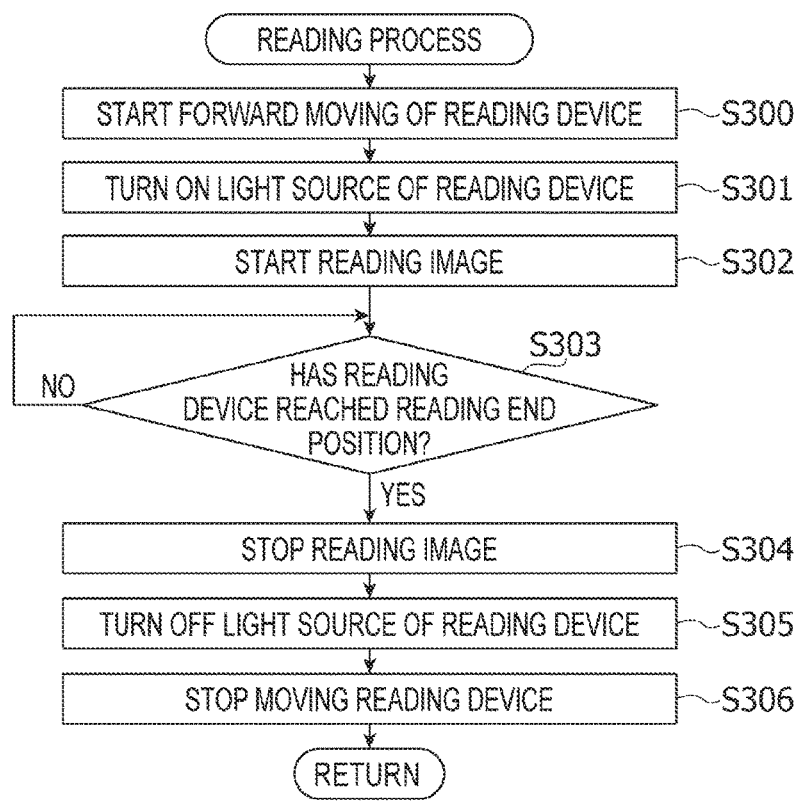
FIG. 7 shows a flowchart illustrating a reading process according to the illustrative embodiment.

The reading process will be described in detail referring to the flowchart shown in FIG. 7. The controller 9 starts moving the reading device 4, which stops at the reading start position PS, in the forward path direction (S300). Next, the controller 9 lights up the light source 43 of the reading device 4 (S302), and starts reading of the image of the original M (S302). Next, the controller 9 determines whether the reading device 4 has reached the reading end position PE (S303). The controller 9 determines whether the motor 59 has rotated by the number of steps necessary for the reading device 4 to reach the reading end position PE based on the count value of the counter 94.

When it is determined that the reading device 4 has not reached the reading end position PE (S303: NO), the controller 9 repeats the determining process at S303. When it is determined that the reading device 4 has reached the reading end position PE (S303: YES), the controller 9 terminates reading of the image (S304). The controller 9 stores the image data generated by the reading device 4 in the RAM 93. Next, the controller 9 puts out the light source 43 of the reading device 4 (S305), stops moving the reading device 4 (S306), and terminates the reading process. Next, the controller 9 executes the post-read moving process (S12: FIG. 12).

<Post-Read Moving Process>

The post-read moving process according to the illustrative embodiment will be described in detail referring to FIGS. 5A and 5B. The controller 9 starts moving the reading device 4, which stops at the reading end position PE, in the return path direction (S100). Next, the controller 9 displays a screen asking whether the user wish to continue reading of the next original (S101). Next, the controller 9 initializes the cover open flag, the cover close flag and the reading continuing flag, and stores the same in the RAM 93, and sets "OFF" to each flag (S102). It is noted that the controller 9 may execute a process S101 during execution of S102-S105 and S111-S113.

<Post-Read Moving Process: Stoppage at Original Detection Position>

A case where the controller 9 stops the reading device 4 at the original detection position PD in the post-read moving process (S12) will be described. In response to receipt of an instruction indicating that a next original subject to reading exists through the operation panel 7, and opening/closing of the cover 3 is detected by the cover sensor 8, the controller 9 stops the reading device 4 at the original detection position PD. In this case, it is likely that the user opens or closes the cover 3 and places the next original M on the original placement face 2a. Therefore, in this case, the controller 9 executes the original size detecting process with respect to the next original M subject to reading, and stops the reading device 4 at the original detection position PD to set the reading end position PE.

A case where the controller 9 stops the reading device 4 at the original detection position PD in the post-read moving process (S12) will be described, referring to FIGS. 5A and 5B. The controller 9 determines whether the cover sensor 8 detects the opening state of the cover 3 (S103). When it is determined that the cover sensor 8 detects the opening state of the cover 3 (S103: YES), the controller 9 sets "ON" to the cover open flag stored in the RAM 93 (S111). Next, the controller 9 determines whether the cover sensor 8 detects the closing state of the cover 3 (S104). When it is determined that the cover sensor 8 detects the closing state of the cover 3 (S104: YES), the controller sets "ON" to the cover close flag (S112). Next, the controller 9 determines whether a user instruction to continue reading of next original is input (S105). When it is determined that an instruction to continue reading the next original M is received through the operation panel 7 (S105: YES), the controller 9 sets "ON" to the reading continuing flag (S113).

Next, the controller 9 determines whether the reading device 4 has reached the original detection position PD (S106). The controller 9 determines whether the motor 59 rotates by the driving steps necessary for the reading device 4 to reach the original detection position PD based on the count value of the counter 94. When it is determined that the reading device 4 has not reached the original detection position PD (S106: NO), the controller 9 repeats from step S103 onwards. When it is determined that the reading device 4 has reached the original detection position PD (S106: YES), the controller 9 determines whether the reading continuing flag is set to "ON" (S107). When it is determined that the reading continuing flag is set to "ON" (S107: YES), the controller 9 determines whether the cover open flag is set to "ON" (S108). When it is determined that the over opening flag is set to "ON" (S108: YES), the controller 9 determines whether the cover close flag is set to "ON" (S109). When it is determined that the cover open flag is set to "ON" (S109: YES), the controller 9 stops the reading device 4, and terminates the post-read moving process (S110). With this control, the reading device 4 is stops at the original detection position PD.

<Post-Read Moving Process: Stoppage at Reading Start Position>

A case where the controller 9 stops the reading device 4 at the reading start position PS in the post-read moving process (S12) will be described. In response to receipt of an instruction that a next original subject to reading exists through the operation panel 7, and the cover sensor 8 has not detected opening/closing of the cover 3, the controller 9 stops the reading device 4 at the reading stat position PS. In this case, since the cover 3 has been closed, the original M which was read in the previous reading process is subject to the next reading process. Since the controller 9 has already set the reading end position PE in the previous original size detecting process, it is unnecessary to execute the original size detecting process again. Therefore, in this case, the controller 9 stops the reading device 4 at the reading start position PS.

In response to receipt of an instruction indicating that the next original subject to reading exists through the operation panel 7, and the cover sensor 8 detects only the open state of the cover 3, the controller 9 stops the reading device 4 at the reading start position PS. In this case, since the cover 3 is kept opened, as described above, there is a possibility that the external light may be incident on the reading device and the controller 9 may not execute the original size detecting process normally. Therefore, the controller 9 sets a right end position of the original placement face 2a as shown FIGS.

1 and 2 as the reading end position PE, and stops the reading device 4 at the reading start position PS.

Next, a case where the controller 9 stops the reading device 4 at the reading start position PS in the post-read moving process (S12) will be described referring to FIGS. 5A and 5B. When it is determined that the cover sensor 8 has not detected the open state of the cover 3 (S103: NO), the controller 9 executes the determining process in from S104 onwards. In this case, the cover open flag stored in the RAM 93 is kept "OFF". It is assumed that the cover close flag and the reading continuing flag are set to "ON" in S104 and S105, respectively. Then, the controller 9 determines that the cover open flag has not been "ON" (S108: NO), and determines whether reading device 4 has reached the reading start position PS (S114). The controller 9 determines whether the motor 59 has rotated by the number of driving steps necessary for the reading device to reach the reading start positon PS based on the count value of the counter 94. When it is determined that the reading device 4 has not reached the reading start position PS (S114: NO), the controller repeats from step S114 onwards. When it is determined that the reading device 4 has reached the reading start position PS (S114: YES), the controller 9 stops the reading device 4, and terminates the post-read moving process (S115). With this control, the reading device 4 stops at the reading start position PS.

It is assumed that the cover open flag is set to "ON" in S103 and S104 is executed. When it is determined that the cover sensor 8 has not detected the closing state of the cover 3 (S104: NO), the controller 9 executes S105. In this case, the cove open flag stored in the RAM 93 is set to "ON" and the cover open flag is maintained to be "OFF". It is also assumed that the reading continuing flag stored in the RAM 93 has been set to "ON" in S105. When it is determined that the cover open flag is set to "ON" (S108: YES), the controller 9 determines whether the cover close flag is set to "ON" (S109). When it is determined that the cover close flag is not set to "ON" (S109: NO), the controller 9 set the reading end position PW as the right end position of the original placement face 2a shown in FIGS. 1 and 2, and stores the number of driving steps of the motor 59 necessary to move the reading device 4. Thereafter, when it is determined that the reading device 4 has reached the reading start position PS (S114: YES), the controller 9 stops the reading device 4 (S115). With this control, the reading device 4 is located to the reading start position PS.

<Post-Read Moving Process: Stoppage at Home Position>

A case where the controller 9 stops the reading device 4 at the home position HP in the post-read moving process (S12) will be described. When it is determined that an instruction to continue reading the next original by the user has not been input (S105: NO), the controller 9 executes from step S106 onwards. In this case, the reading continuing flag stored in the RAM 93 is maintained to be "OFF". Then, the controller 9 determines that the reading continuing flag hast not been set to "ON" (S107: NO), continues moving the reading device 4 in the return path direction until the reading device 4 reaches the home position HP, and then stops the reading device 4 at the home position HP.

<Post-Read Controlling Process>

After terminating the post-read moving process (S12), the controller 9 executes S13 in FIG. 4B. In S13, the controller 9 determines whether the reading device 4 is located at the original detection position PD. When it is determined that the reading device 4 is located at the original detection position PD (S13: YES), the controller 9 executes the original size detecting process (S19), and then repeats from step S11 onwards. When it is determined that the reading device 4 is not located at the original detection position PD (S13: NO), the controller 9 determines whether the reading device 4 is located at the reading start position PS (S14). When it is determined that the reading device 4 is located at the reading start position PS (S14: YES), the controller 9 repeats from step S11 onwards. When it is determined that the reading device 4 is not located at the reading start position PS (S14: NO), the controller 9 determines that the reading device 4 is located at the home position HP, and terminates the controlling process of the image reading apparatus 1.

The image reading apparatus 1 according to the illustrative embodiment has the original placement face 2a on which the original M is to be placed, the cover 3 configured to be movable between a position where the cover 3 covers the original placement face 2a, and a position where the cover 3 exposes the original placement face 2a, and the CIS 44 including a plurality of reading elements arranged in the main scanning direction and reads an image on the original M, which is subject to reading and placed on the original placement face 2a, with moving in the auxiliary scanning direction which is orthogonal to the main scanning direction.

The controller 9 is configured to execute the reading process causing the CIS 44 to move, in the auxiliary scanning direction, from the reading start position PS set at one end in the auxiliary scanning direction to the reading end position PE set at the other end in the auxiliary scanning direction and to read the image of the original M, a determining process to cause the CIS 44 to read the image of the original M subject to reading with moving the CIS 44 from an original detection position PD, which is set between the reading start position PS and the reading end position PE, and is spaced from the reading start position PS by a particular distance in the auxiliary scanning direction, toward the reading start position PS, and determine the main direction width of the original M subject to reading based on the image data of the read image of the original M, and a setting process causing the controller 9 to determine the reading end position PE based on the main direction width determined in the determining process.

After execution of the reading process, the controller 9 executes the moving process to move the CIS 44 from the reading end position PE toward the reading start position PS, while executes the detecting process to detect an instruction to continue reading the next original during a period before the CIS 44 reaches the original detection position PD. When an instruction to continue reading the next original, the controller 9 does not move the CIS 44 to the reading start position PS, but terminates the moving process when the CIS 44 has reached the original detection position PD. With this control, in an apparatus configured to read originals with determining the size of the original placed on the original placement table, a time period necessary to read a plurality of originals can be shortened.

The controller 9 repeatedly executes the detecting process during period before the CIS 44 reaches the original detection position PD by the moving process. With this control, the controller 9 can detects an instruction to continue the next reading process accurately.

Further, the image reading apparatus 1 according to the illustrative embodiment has the operation panel 7 configured to receive the input operation by the user, and the detecting process includes an operation detecting process to detect instructions, which is input through the operation panel 7, to continue reading the next original. With this control, the user can easily input instructions to continue reading the next original, thereby user's convenience being improved.

The image reading apparatus 1 has a display 6. During execution of the detecting process, the controller 9 executes a displaying process to display an inquiry to continue/discontinue reading the next original on the display 6. With this control, the user can recognize a timing at which such an instruction is to be input, thereby improving a convenience of the user.

The image reading apparatus 1 according to the illustrative embodiment includes the cover sensor 8 to detect opening/closing state of the cover 3. The detecting process includes an open/close detection process which detects the opening/closing state of the cover 3 by the cover sensor 8 as an instruction to continue reading of the next original. Therefore, the controller 9 can detect the instruction to continue reading of the next original with high accuracy.

The controller 9 executes the reading process after executing the setting process with respect to the next original, and after moving the reading device to the reading start position PS. With this configuration, the controller 9 can execute the reading process with respect to the next original without moving the CIS 44 from the reading start position PS to the home position HP, and from the home position HP to the reading start position PS. Therefore, it becomes possible to shorten a time period required to start reading the next original.

According to the illustrative embodiment, the home position HP, which is a standby position of the CIS 44, is set at one end in the auxiliary scanning direction with respect to the reading start position PS. When an instruction to continue reading of the next original has not been detected in the detecting process, the controller 9 terminates the moving process when the CIP 44 reaches the home position HP. With this configuration, it becomes possible to locate the CIS 44 at the home position at the standby state. Accordingly, it becomes possible to shorten the time until the pre-read compensating process for the next reading process is executed.

Other Embodiments

It is noted that aspects of the disclosures need not be limited to the above-described illustrative embodiment and accompanying drawings. For example, configurations described below are included in the aspects of the disclosures.

(1) The description above is made referring to the image reading apparatus 1. It is noted that the aspects of the disclosures need not be limited to the configuration of the above-described illustrative embodiment. For example, the image reading apparatus may be an MFP (multi-function peripheral) having a printer function, a copier function, a facsimile function and a facsimile function.

(2) According to the illustrative embodiment, the image reading apparatus 1 has a single CPU 19, and respective processes are executed by the CPU 91. Aspects of the disclosure need not be limited to such a configuration, and the image reading apparatus may be optionally or alternatively provided with multiple CPU's and/or hardware circuits such as an ASIC (application specific integrated circuit).

(3) The programs executed by the CPU 91 are not necessarily be stored in the ROM 92. At least part of the programs may be stored by CPU 91 itself, or other storage devices.

Figure 5A:
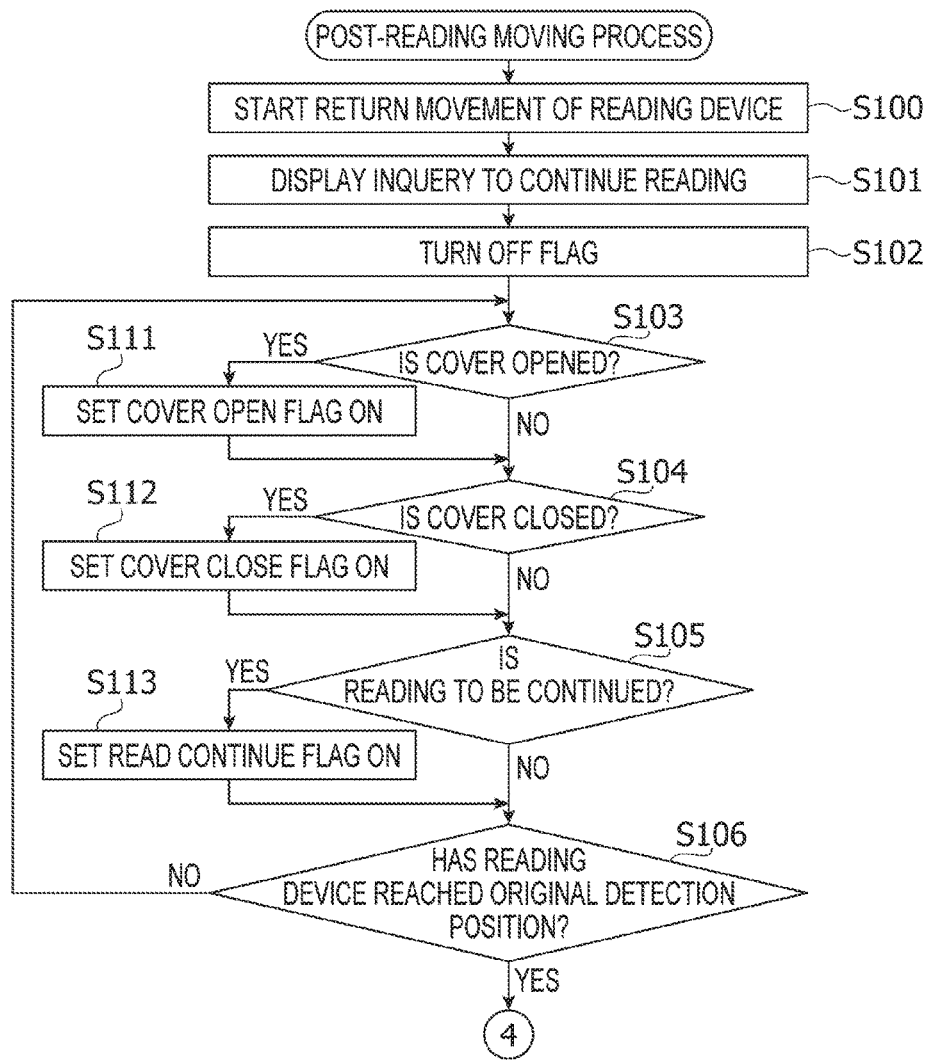
FIGS. 5A and 5B show a flowchart illustrating a post-reading moving process according to the illustrative embodiment.

(4) The controller 9 may be configured not to execute S101 in FIG. 5A. According to such a modified configuration, it becomes unnecessary to provide the display 6. Therefore, with a simple configuration, a time necessary to read multiple originals can be shortened.

Figure 5B:
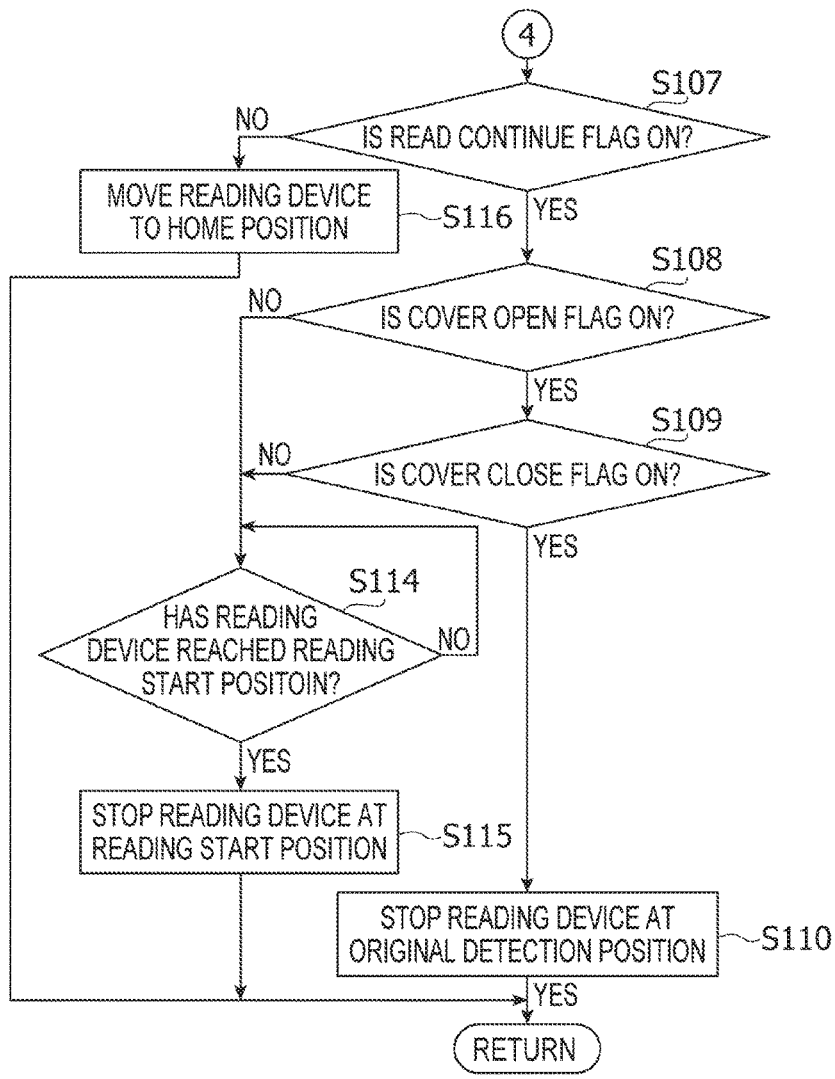

(5) The controller 9 may be configured not to execute S103, S104, S108, S109 and S111-S113 shown in FIGS. 5A and 5B. In such a configuration, when it is determined that the reading continuing flag is "ON" (S107: YES), the controller 9 may stop the reading device 4 and terminate the post-read moving process (S110). According to such a configuration, it becomes unnecessary to provide the cover sensor 8. Therefore, with a simple configuration, a time necessary to read multiple originals can be shortened.

(6) The controller 9 may be configured not to execute S105, S107 and S113 shown in FIGS. 5A and 5B. In such a case, when it is determined that the cover flag is "ON" (S108: YES), and the cover close flag is "ON" (S109: YES), the controller 9 may stop the reading device 4 and terminate the post-read moving process (S110). With this configuration, it becomes unnecessary to provide the operation panel 7. Therefore, with a simple configuration, a time necessary to read multiple originals can be shortened.

(7) The controller 9 may be configured not to execute S110 in FIG. 5B. That is, when it is determined that the reading device 4 has reached the original detection position PD (S106: YES), the reading continuing flag is set to "ON" (S107: YES), the cover open flag is set to "ON" (S108: YES), and the cover close flag is set to "ON" (S109: YES), the controller 9 may execute the original size detecting process (S19 in FIG. 4B).

According to the above configuration, since the controller 9 execute the original size detecting process without stopping the reading device 4 at the original detection position PD, a time period necessary for reading the multiple originals can be shortened further.

Figure 6:
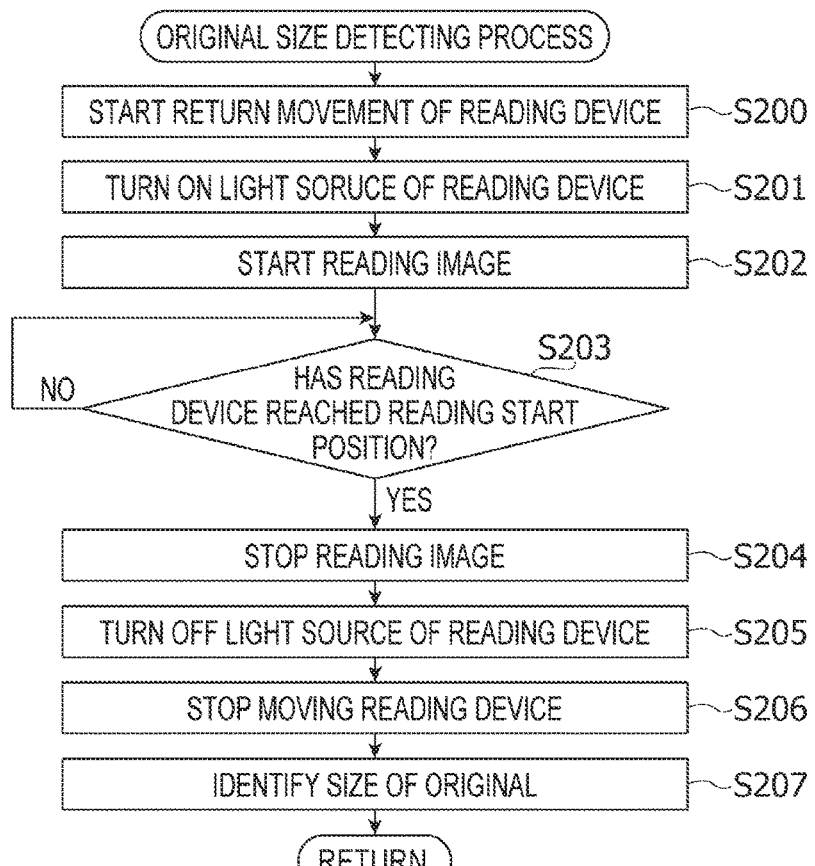
FIG. 6 shows a flowchart illustrating an original size detecting process according to the illustrative embodiment.

(8) The controller 9 may be configured not to execute S207 in FIG. 6. The controller 9 may set the reading end position PE at a position spaced from the reading start position by a particular distance. In such case, the reading end position PE is determined as a position spaced form the reading start position PS by the particular distance in the auxiliary scanning direction, and on a side opposite to the reading start position PS with respect to the original detection position PD.

With the above configuration, it becomes unnecessary that the fixed-size original table is stored in the ROM 92, a memory capacity can be saved, and a time period until completion of the original size detecting process can be shortened.

(9) It is noted that the reading device 4 is not limited to one using the CIS 44. For example, the reading device 4 may be one using a CCD (charge coupled device) instead of the CIS. In such a case, the CCD may be of a so-called unit scanning type, or a so-called mirror scanning type.

What is claimed is:
1. An image reading apparatus, comprising:
an original supporting plane configured to support an original to be read;
a cover movable between a covering position to cover the original supporting plane and an opening position to expose the original supporting plane;
a reading device having multiple reading elements arranged in a main scanning direction, the reading device being configured read an image on the original supported by the original supporting plane with moving a reading location on the image in an auxiliary scanning direction which is orthogonal to the main scanning direction; and a controller, wherein the controller is configured to execute:

a reading process in which the controller causes the reading device to read the image on the original placed on the original supporting plane with moving the reading location in the auxiliary scanning direction from a first position which is a reading start position to a second position which is a reading end position, and to generate image data representing the image of the original; and a determining process in which the controller causes the reading device to read the image on the original with moving the reading location in the auxiliary scanning direction from a third position to the first position, the third position being a position between the first position and the second position and spaced from the first position, in the auxiliary scanning direction, by a particular distance, and the controller determines a width of the original in the main scanning direction subject to scanning based on the image data, the determining process being executed before execution of the reading process, wherein the controller is configured to further execute, after execution of the reading process:

a moving process in which the controller moves the reading location from the second position to the first position; and a detecting process in which the controller detects an instruction to continue reading a subsequent original during a period before the reading location reaches the third position by the moving process, and wherein, when it is determined that the instruction to continue reading the subsequent original in the detecting process, the controller is configured to terminate the moving process when the reading location reaches the third position, without moving the reading location further to the first position.

2. The image reading apparatus according to claim 1, wherein the controller is configured to execute the detecting process repeatedly when the moving process is executed until the reading location reaches the third position.

3. The image reading apparatus according to claim 2, further comprising an operation panel through which the controller is configured to receive a user operation to input an instruction, and the controller is configured to execute an operation detecting process, during execution of the detecting process, to detect an instruction to continue reading a subsequent original input through the operation panel.

4. The image reading apparatus according to claim 3, further comprising a display, wherein the controller is configured to execute a displaying process, during execution of the detecting process, in which the configure displays a display inquiring whether reading of the subsequent original is continued.

5. The image reading apparatus according to claim 2, further comprising a detector to detect open/close state of the cover, wherein the controller is configured to execute an open/close detecting process, during execution of the detecting process, in which the controller detects the open/close state of the cover as instruction to continue reading the subsequent original.

6. The image reading apparatus according to claim 2, wherein the controller is further configured to move the reading location to the first position and execute the reading process after executing the setting process.

7. The image reading apparatus according to claim 1, wherein a fourth position is defined at a position on one end side in the auxiliary scanning position with respect to the first position as a standby position of the reading location, and wherein the controller terminates the moving process when the instruction to continue reading the subsequent original has not been received in the detecting process and the reading location reaches the fourth position.

8. The image reading apparatus according to claim 1, wherein the first position is defined at one end side in the auxiliary scanning direction and the second position is defined in an opposite side to the first position in the auxiliary scanning direction.

9. The image reading apparatus according to claim 8, wherein the controller is further configured to execute a setting process in which the controller sets second position based on the width of the original determined in the determining process.

10. The image reading apparatus according to claim 9, wherein the controller is configured to execute the detecting process repeatedly when the moving process is executed until the reading location reaches the third position.

11. The image reading apparatus according to claim 10, further comprising an operation panel through which the controller is configured to receive a user operation to input an instruction, and the controller is configured to execute an operation detecting process, during execution of the detecting process, to detect an instruction to continue reading a subsequent original input through the operation panel.

12. The image reading apparatus according to claim 11, further comprising a display, wherein the controller is configured to execute a displaying process, during execution of the detecting process, in which the configure displays a display inquiring whether reading of the subsequent original is continued.

13. The image reading apparatus according to claim 10, further comprising a detector to detect open/close state of the cover, wherein the controller is configured to execute an open/close detecting process, during execution of the detecting process, in which the controller detects the open/close state of the cover as instruction to continue reading the subsequent original.

14. The image reading apparatus according to claim 9, wherein the controller is further configured to move the reading location to the first position and execute the reading process after executing the setting process.

15. The image reading apparatus according to claim 9, wherein a fourth position is defined at a position on one end side in the auxiliary scanning position with respect to the first position as a standby position of the reading location, and wherein the controller terminates the moving process when the instruction to continue reading the subsequent original has not been received in the detecting process and the reading location reaches the fourth position.

16. An image reading apparatus comprising:

a frame including an original supporting plane configured to support an original on the original supporting plane;

a cover provided above the original supporting plane, the cover being movable between an open position and a closed position and configured to cover the original supporting plane while the cover is at the closed position;
a reading device having a plurality of photoelectric conversion elements arranged in a main scanning direction and movable between a first position and a second position in a sub scanning direction orthogonal to the main scanning direction; and
a controller configured to:
control the reading device to move to a third position that is between the first position and the second position;
control the reading device to move from the third position to the first position in the sub scanning direction and to read an image of the original on the original supporting plane while the reading device moves from the third position to the first position;
determine a length of the original in the main scanning direction based on the read image;
control the reading device to move from the first position to the second position in the sub scanning direction and to read the image of the original on the original supporting plane while the reading device moves from the first position to the second position;
control the reading device to move from the second position toward the first position;
determine whether the controller receives an instruction to read an image until the reading device arrives at the third position while the reading device moves from the second position toward the first position;
when the controller receives the instruction until the reading device arrives at the third position, control the reading device to be positioned at the third position; and
when the controller does not receive the instruction until the reading device arrives at the third position, control the reading device to move to the first position.

17. The image reading apparatus of claim 16, wherein a distance between the first position and the third position is less than a distance between the third position and the second position.

18. An image reading method employed in an image reading apparatus having an original supporting plane configured to support an original thereon, on the original supporting plane, a cover movably arranged above the original supporting plane, a reading device configured to read a linearly extending area of an image a main scanning direction and is movable between a first position and a second position in a sub scanning direction orthogonal to the main scanning direction, the method comprising:
moving the reading device to a third position that is between the first position and the second position;
moving the reading device from the third position to the first position in the sub scanning direction and causing the reading device to read an image of a first original on the original supporting plane while the reading device moves from the third position to the first position;
determining a length of the first original in the main scanning direction based on the read image;
moving the reading device from the first position to the second position in the sub scanning direction and causing the reading device to read the image of the first original on the original supporting plane while the reading device moves from the first position to the second position;
moving the reading device from the second position toward the first position;
determining whether the image reading apparatus receives an instruction to read an image of a second original until the reading device arrives at the third position while the reading device moves from the second position toward the first position;
locating the reading device at the third position when the image reading apparatus receives the instruction until the reading device arrives at the third position;
moving the reading device from the third position to the first position in the sub scanning direction and causing the reading device to read an image of the second original on the original supporting plane while the reading device moves from the third position to the first position;
determining a length of the second original in the main scanning direction based on the read image; and
moving the reading device from the first position to the second position in the sub scanning direction and causing the reading device to read the image of the second original on the original supporting plane while the reading device moves from the first position to the second position.

* * * * *